Aug. 5, 1924.
W. R. LOVE
1,503,691
DISPENSING APPARATUS
Filed Oct. 28, 1919   4 Sheets-Sheet 1
Fig. 1.
Fig. 2.
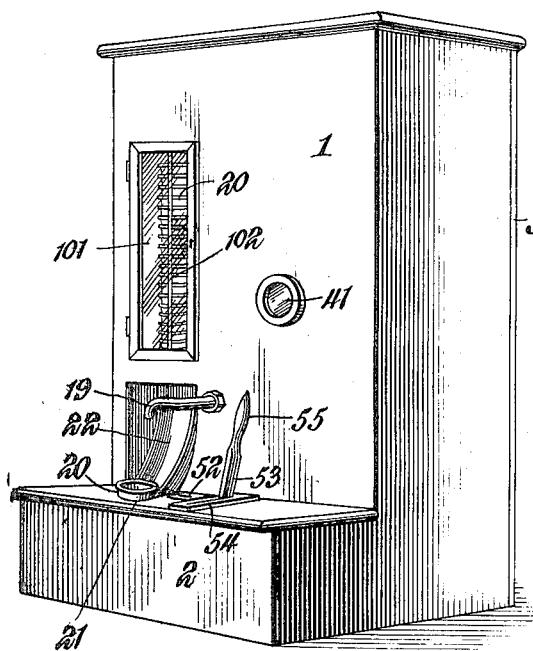
Fig. 12.
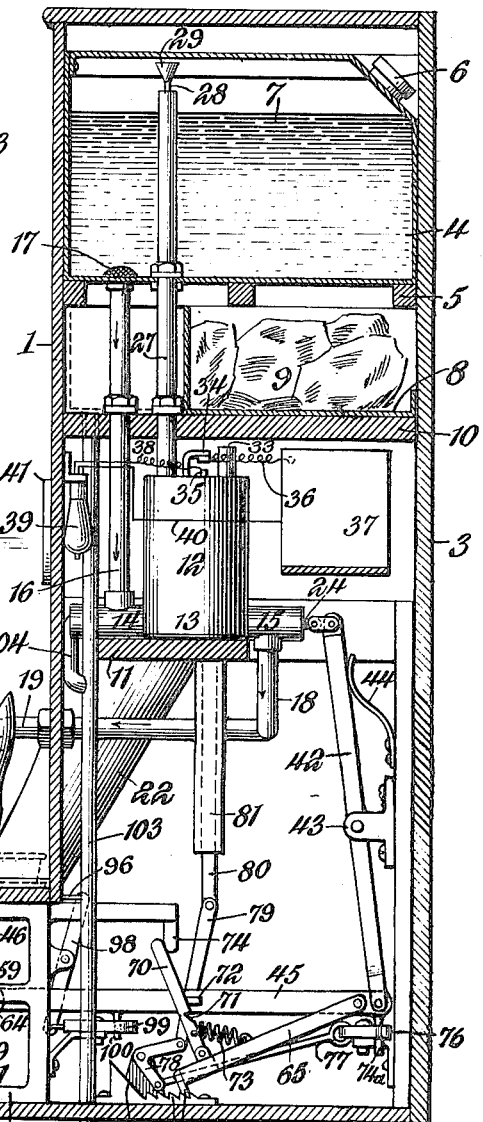
WITNESSES
Howard D. Orr
F. T. Chapman.
William R. Love, INVENTOR,
BY
ATTORNEY

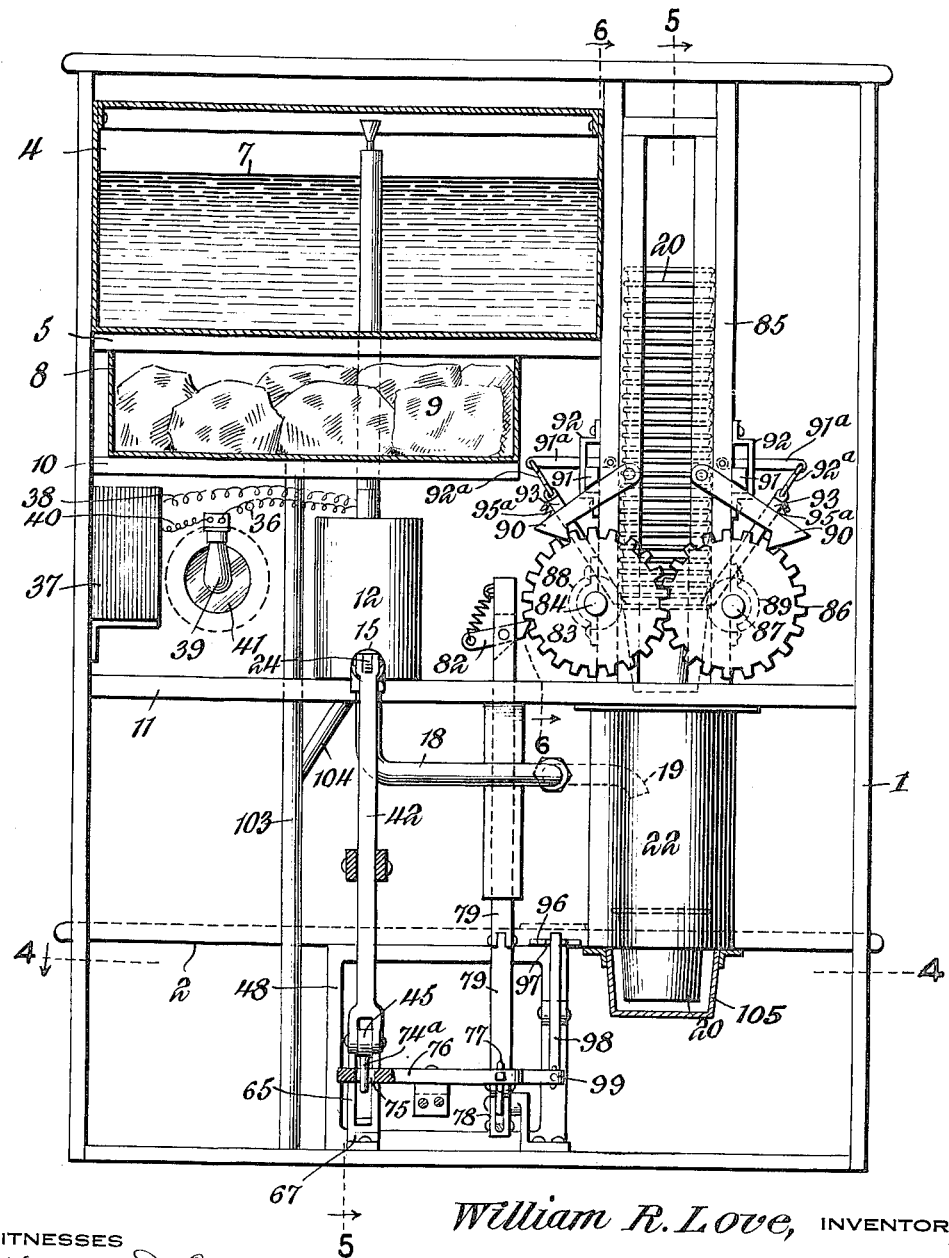

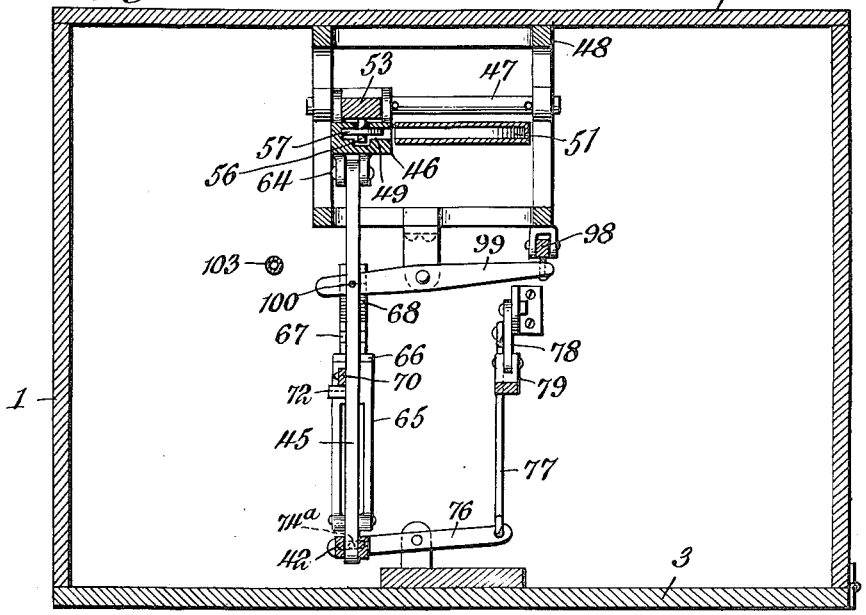

Aug. 5, 1924.
W. R. LOVE
1,503,691
DISPENSING APPARATUS
Filed Oct. 28, 1919  4 Sheets—Sheet 4
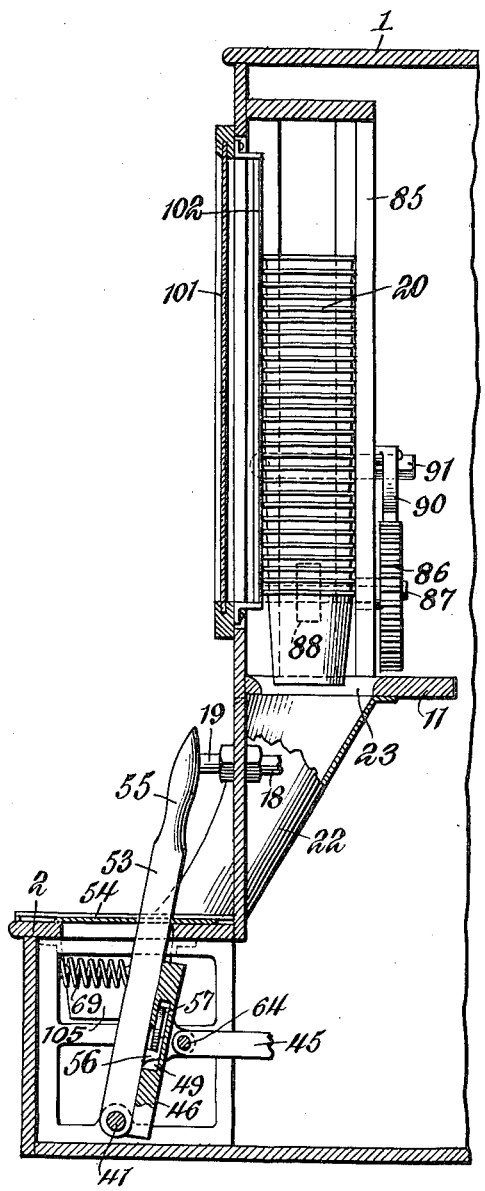
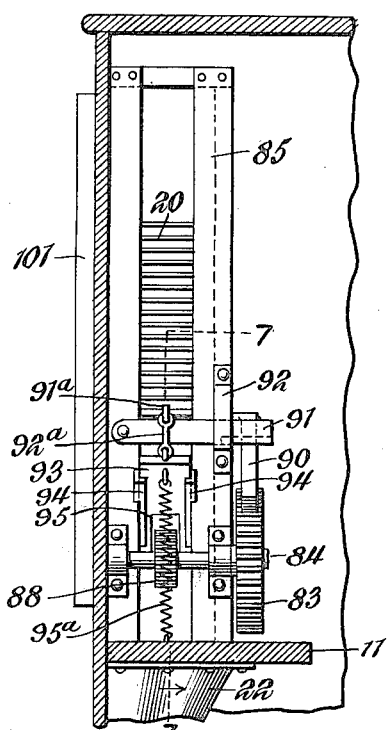
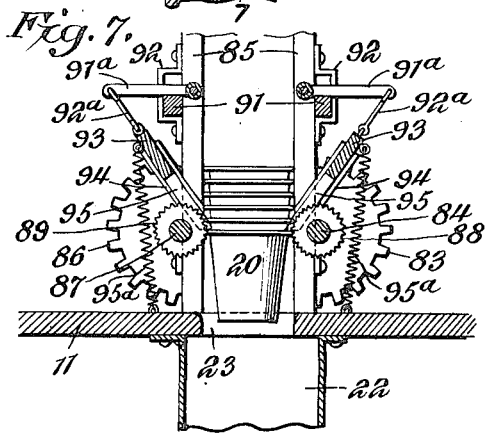
William R. Love, INVENTOR, Patented Aug. 5, 1924.

1,503,691

UNITED STATES PATENT OFFICE.

WILLIAM R. LOVE, OF ARMOUR, NORTH CAROLINA.

DISPENSING APPARATUS.

Application filed October 28, 1919. Serial No. 334,010.

*To all whom it may concern:*

Be it known that I, WILLIAM R. LOVE, a citizen of the United States, residing at Armour, in the county of Columbus and State of North Carolina, have invented a new and useful Dispensing Apparatus, of which the following is a specification.

This invention has reference to dispensing apparatus and is designed particularly for dispensing soda water or other like liquids, with the dispensing apparatus controllable by a suitable coin or token.

In accordance with the invention, the machine is provided with a suitable casing containing a reservoir for the liquid to be dispensed, and means for controlling the temperature of the liquid, say ice for cold liquids and a burner or other heat-producing means for hot liquids. Provision is made for directing measured quantities of the liquid to an accessible container, such as a paper cup, into which the measured quantity of liquid is automatically discharged, and the purchaser is then able to remove the filled cup and imbibe the liquid.

The invention contemplates the use of manually operable means for measuring and discharging the measured quantity of liquid, which manually operable means may be in the form of a lever or pull, although not necessarily confined to such device. Provision, however, is made for preventing operative movements of the lever, although inactive movements may be permitted unless a suitable coin be introduced, whereupon the lever becomes locked to operating mechanism by which the delivery side of the machine is set into action.

Provision is also made for notifying the operator that the measuring mechanism for the liquid is operating, so that the operator will be constrained to wait for the delivery of the liquid, should it seem slow.

In order to insure the proper operation, full stroke mechanism is provided, and a signal, preferably an audible signal, is caused to apprise the operator when the full stroke of the operating lever is completed.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a perspective view of a dispensing apparatus embodying the invention.

Figure 2 is a front to rear vertical section through the casing, showing some parts in elevation and drawn on a larger scale than Figure 1.

Figure 3 is a rear elevation with the back of the casing omitted and some parts shown in section.

Figure 4 is a section on the line 4—4 of Figure 3.

Figure 5 is a section on the line 5—5 of Figure 3.

Figure 6 is a section on the line 6—6 of Figure 3.

Figure 7 is a section on the line 7—7 of Figure 6.

Figure 8 is a section on the line 8—8 of Figure 2.

Figures 9, 10 and 11, are detail sections of the coin-controlled lock.

Figure 12 is a vertical section of the liquid-measuring receptacle.

Referring to the drawings, there is shown a casing 1 of appropriate shape to accomodate certain structures, and this casing is provided at the lower end with a forward extension 2 to accommodate certain other structures. In order to permit controllable access to the casing, it is provided with a rear closure or door 3.

In the upper portion of the body of the casing 1, there is located a tank 4, shown as resting on a suitable support 5, and the tank is also indicated as provided with a filling neck 6. When the dispensing apparatus is utilized for carbonated drinks, such liquid is placed in the tank 4 and the filling neck 6 is suitably closed to maintain the charging gas in the liquid, which liquid is indicated in Figures 2 and 3, at 7. For those liquids which are usually served cold, there is provided a pan 8 to receive ice 9 and this pan is mounted on a support 10 within the casing 1, underneath the tank 4. In order that the liquid 7 may be quickly chilled, the support 5 is of skeleton nature whereby the cooling effect of the ice may act immediately upon the tank 4 and the liquid therein. In the case of the dispensing apparatus being employed for hot drinks, it is only necessary to replace the ice receptacle with heating means.

Within the body of the casing 1, at a lower point than the support 10, is a shelf 11, carrying a measuring receptacle 12, shown in detail in Figure 12. The receptacle 12 may be conveniently made of sheet metal and is preferably, although not necessarily, of cylindrical shape. Extending transversely of the receptacle 12, at the bottom thereof, is a tubular valve casing 13, with ends 14, 15 projecting beyond the opposite walls of the casing 12. Communicating with one end 14 is a supply pipe 16 rising through the refrigerating space above the receptacle and entering the tank 4 at the bottom thereof, where the pipe may be provided with a strainer 17. Communicating with the end 15 of the casing 13, is another pipe 18 carried downwardly therefrom, and to the front of the casing 1, through which the pipe 18 is extended, and formed into a discharge neck or spout 19. The discharge end is appropriately curved and located to discharge liquid into a cup 20 supported in an opening 21 in the top of the forward extension 2 of the casing 1. The opening 21, or other means for holding the cup, is so arranged that the cup, when in position to received liquid, is accessible to a customer and may be readily grasped and removed. In order to direct cups into the cup-holder represented by the opening 21, but which may be otherwise arranged, there is provided a chute 22 extending from the shelf 11, downwardly within the casing at an appropriate slant, so that the cups directed to a suitable opening 23 in the shelf 11 will gravitate along the chute 22 to the exterior of the casing, and be directed by the chute into the opening 21, which opening is of such size as to permit a cup to enter the opening but not pass through it, whereby the cup is temporarily supported beneath the spout end of the pipe 18.

In order that measured quantities of the liquid 7 may be directed into the cup, there is within the valve casing 13, a slidable valve composed of a reciprocatory valve rod 24 with valves 25, 26 fast thereon and located in the extensions or ends 14 and 15 of the casing. The valves 25 and 26 are so spaced that in one position the valve 25 will open the lower end of the feed pipe 16 to the interior of the measuring receptacle 12, while at the same time the valve 26 occupies the portion of the end 15 between the receptacle 12 and the outlet pipe 18, the extremity of the end 15 being closed. In another position of the control valve for the receptacle 12, the valve 25 closes the lower end of the pipe 16, while the valve 26 moves from the first position across the upper end of the pipe 18, into that portion of the end 15 of the valve casing beyond the pipe 18, so that the interior of the receptacle 12 is then in communication with the discharge pipe 18. The valves 25 and 26 may be conveniently made of cork, although other suitable materials may be employed. Cork, however, is not affected by the liquids used and has sufficient elasticity to maintain the valve casing liquid-tight where desired.

Extending upwardly from the top of the receptacle 12, there is a pipe 27 rising into the reservoir 4 to a point higher than the surface level of the liquid 7, this pipe being there open. Extending through the pipe 27 is a rod 28, on the upper end of which is a valve 29 seating in the upper end of the pipe 27. At the lower end, the rod 28 extends into the receptacle 12, and there is made fast to another valve 30, in turn fast to a float 31 within the receptacle, the float approximating in cross-sectional area that of the receptacle 12, so as to move freely therein. On the float 31 is another valve 32 positioned to close and open a short duct 33 in the top of the receptacle 12, whereby to prevent any material escape of gases from the receptacle 12, and also to permit the rise of the float to the seating position of the valve while the receptacle is filling. Carried by the float 31 is an electric circuit terminal 34, and in the path of the terminal 34, the casing of the receptacle 12 carries another circuit terminal 35. One of these terminals, say the terminal 34, is connected by a conductor 36 to one side of a suitable source of current, such as an electric battery, enclosed in a casing 37, and the other terminal 35 is connected by a conductor 38 to one side of an electric lamp 39, the other side of which is connected, by a conductor 40, to the battery enclosed in the casing 37. The electric lamp is lodged behind a window 41 in the face or front of the casing 1 so as to be prominently visible to a customer. The arrangement is such that when the receptacle 12 is filled, and therefore the float 31 is at its highest point, closing the ducts 27 and 33, the electric circuit is broken at the terminals 34 and 35, and consequently the lamp 39 is then dark. As soon as the valves 25 and 26 have been moved in the proper direction to cause the outflow of liquid from the receptacle 12, the float 31 drops until the contacts 34 and 35 are brought together, thus energizing the lamp 39. This condition of energization of the lamp continues until the valves 25 and 26 have been moved to place the reservoir 4 in communication with the receptacle 12, and the receptacle has become filled to raise the float 31 so as to break the circuit at the terminals 34 and 35. The customer is thus apprised of the fact that the dispensing apparatus is working, even though no liquid immediately appears at the spout 19, and he may also know that the vending machine is in operative condition to dispense liquid.

The valve rod 24 is connected to one end of a rock lever 42, pivotally carried by a bracket 43 suitably supported within the casing. A spring 44 is arranged to urge the lever 42 in a direction to maintain the valves 25 and 26 in proper position to prevent passage of liquid from the receptacle 12 to the outlet spout 19. The other or lower end of the lever 42 is connected to one end of a pull bar 45, located near the bottom of the casing 1, and entering the forward extension thereof. The front end of the pull bar 45 is pivoted to a substantially upright lever 46, having a pivotal connection 47, to a frame 48 located in the forward extension 2. The lever 46 rises in the extension 2 to a point near the upper end thereof but still below the top of the extension. The lever 46, shown in Figures 2, 5, 9 and 10, is provided with a side entering slot 49 with a slanting bottom wall 50. The higher end of the slot 49 opens opposite one end of a chute 51, which chute rises toward the top of the extension 2, and there covered by a slotted coin plate 52 having the slot of a suitable size to admit an appropriate coin. It is to be understood that the dispensing machine may be provided with any appropriate means for preventing the fraudulent operating of the machine, but as there are numerous devices for the purpose, no showing of any such devices is incorporated in the drawing or in the description. Mounted on the same pivotal axis 47 as the lever 46 is an operating lever 53 rising through the extension 2, and above the top of the latter through a slotted guard plate 54, and terminating in a hand hold 55 in the front of the main body of the casing 1 and within easy reach of the operator. The operating lever 53 is provided with a hook-shaped lug 56 positioned to enter the slot 49. The hook end of the lug 56 is so spaced from the corresponding face of the lever 53 that a coin 57 rolling on edge through the chute 51 will enter the slot 49 and roll into the hook-shaped lug 56, thereby locking the levers 46 and 53 together.

That edge of the lever 46, remote from the entering end of the slot 49, is adjacent to a cross arm 58 of the frame 48, said arm carrying a one-way yieldable gravity latch 59$^a$ to engage one arm 59 of a rock lever 60, having the outer arm in the form of a head 61 with a curved face 62 and tongue 62$^a$ in the path of the coin 57. A spring 63 constrains the lever 60 in the position to normally arrest movement of an inserted coin, but when the end 59 of the lever 60 is moved against the action of the spring 63 by the latch 59$^a$, the inserted coin 57 will then readily roll out of the slot 49 and so escape from between the levers 46 and 53.

While the levers 46 and 53 are locked together, by the inserted coin 57, an operator grasping the handhold 56, may pull the lever 53 forwardly, and this movement is participated in by the lever 46 temporarily locked to said lever 53.

The forward end of the pull bar 45 has a pivot connection 64, so that when the lever 53 is pulled forwardly, the lever 42 participates in such movement and the piston rod 24 is appropriately moved to open the pipe 18 to the receptacle 12 and close the pipe 16 to said receptacle. Under such circumstances, a charge of the liquid being dispensed will be delivered to the spout 19.

Connected at one end to the pull bar 45, is a rod 65 carrying at the other end a tooth 66 in position to travel over a series of ratchet teeth 67, this toothed bar and ratchet teeth forming a full stroke mechanism terminating in an incline 68, by which, when the lever 53 is operated, the stroke of the lever must be completed before it can be returned to its first position. A compression spring 69 engaging the lever 53 serves to maintain the lever 53 normally in engagement with the lever 46 with the parts associated to permit an inserted coin 57 to readily find its way into the slot or recess 49 and lock the two levers 46 and 53 together.

Carried by the rod 65 is a pivoted arm 70, with a notch 71 therein, in position to engage a lug 72 on the pull bar 45. A spring 73, fast at one end to the arm 70 and at the other end to the bar 65, holds the bar 70 elastically against the lug 72, so that when the notch 71 coincides with the lug 72, the arm 70 will be pulled over to cause a latching of the arm 70 with the lug 72. This occurs when the lever 53, locked to the lever 46, has been pulled forwardly and the range of forward movement is completed. Then, on releasing the lever 53, the spring 69, assisted by the spring 44, causes a return movement of the levers and parts controlled thereby with the tooth 66 lifted out of engagement with the ratchet teeth 67, wherefore the return movement is quick and not interfered with. As soon as the return movement is about completed, the arm 70 is brought into engagement with a fixed finger 74 on a fixed part of the structure, but the engagement occurs before the return movement is quite completed, wherefore the arm 70 is pulled out of latched engagement with the lug 72 and the tooth 66 falls into position to engage the end one of the teeth 67 ready for constraining the next forward movement of the lever 53 to a full stroke movement.

At the rear end of the pull bar 45 is a tongue 74a extending through a hole 75 in one end of a horizontal rock lever 76, the other end of which is connected by a link 77 to a bell crank lever 78, in turn connected by a link 79 to the lower end of an upright slide 80 rising through a guiding housing 81 depending from the shelf 11. Above the shelf through which the slide 80 extends, said slide carries a spring-controlled dog 82, engaging the teeth of a gear wheel 83 fast on a shaft 84 journaled on one side of an upright cup-holder 85 in which is located a stack of cups 20. On the other side of the casing 85 from the gear wheel 83, is another gear wheel 86 meshing therewith and mounted on the shaft 87 journaled on the other side of the casing 85. The slide 80 causes the actuation of both shafts 84 and 87 in opposite directions, because of the presence of meshing gear wheels 83 and 86. The shafts 84 and 87 carry roughened or corrugated rollers 88, 89, respectively, so located as to engage the rim of the cup 20 on a level with the corrugated wheels, thus serving to hold and feed the cups. Pivoted to the casing 85, on opposite sides thereof, are toothed dogs 90, engaging the teeth of the gear wheels 83 and 86. Each dog 90 engages a rock arm 91 pivoted to the side of the casing remote from the dog and extending through a keeper 92. Each arm 91 underrides an arm 91a pivoted at one end to the casing 85 and at the other end connected by a link 92a to a slide 93 in a guide 94, the slide having the lower end bifurcated, as shown at 95, to straddle a corresponding one of the toothed wheels or rollers 88 or 89, as the case may be. A spring 95a constrains the slide 93 toward and into engagement with the lowermost one of the cups 20 of the stack at the large or upper end thereof, these cups being preferably paper cups with reinforced rims or margins. The purpose of the slides 93 is to supplement the corrugated wheels 88, 89, in feeding the cups, thus certainly feeding one cup each time the lever 53 is actuated, with the movement so timed that the cup is delivered soon enough to drop into place beneath the spout 19 to receive the contents of the receptacle 12 when discharged therefrom.

In order to protect the coin slot 52 from access when a coin is already present between the levers 46 and 53 to lock them, there is provided a plate 96 entering the extension 2 below the top thereof through a guiding slot 97. The plate 96 is under the control of one end of a lever 98, the other end of which is connected by another lever 99 controlled by a pin 100 carried by the pull bar 45, the parts being so timed that when the bar 45 is in its normal position, the plate 96 is withdrawn from obstructing relation to the coin slot, but when the pull bar 45 is moved by an operator manipulating the lever 53, the coin slot is closed by said plate 96.

The front of the casing 1 is provided with a door 101 having a glass pane therein so as to expose to view the stack of cups within the cup-holding casing 85. Moreover, the door 101 carries a rod 102 so positioned lengthwise of the stack of cups 20 that the rod 102 will hold these cups from tipping one way or the other. The door 101, with the rod 102, provides a means whereby the supply of cups may be readily renewed on opening the door and the stack of cups is held in place by the rod when the door is closed.

In order to dispose of water which may accumulate from the ice in the chilling chamber, there is provided a drain pipe 103, and in order to dispose of any leakage past the valve 25, there is another drain pipe 104 discharging into the pipe 103. The extension 14 is open at the outer end so that there is no interference with the movement of the valve 25.

To dispose of any overflow or splashing of liquid where discharged into the cup 20 located beneath the spout 19, there is provided a drain pan 105 within the extension 2 in surrounding relation to the cup holder opening 21, and this drainage receptacle 105 is provided with an outlet pipe 106 discharging at any convenient point.

In order that the customer may be made aware of the fact that the full stroke of the operating lever has been completed, a signal 107 is provided. This signal may be conveniently produced by an electric bell or by any other suitable means, and in the case of a bell, it is included in a circuit charged by a battery 108, which may, if desired, be the same as the battery energizing the lamp 39. At some fixed point in the casing, say in the extension 2, is an electric contact 110, and on the lever 49 is another contact 111 in the path of which the contact 110 is located, and this last-named contact may be adjustable for properly timing the closing of the circuit and the ringing of the bell or signal 107. It will be understood, of course, that suitable directions for the working of the apparatus are displayed within view of the customer, say on the front of the casing 1, although such directions are not indicated in the drawing.

What is claimed is:

1. In a dispensing apparatus for liquids, a reservoir for the liquids, a measuring receptacle for the liquid, a pipe for the inflow of liquid from the reservoir to the receptacle, a pipe for the discharge of liquid from the receptacle to a point of disposal, mechanically connected spaced valves for and individual to the inlet and outlet of the measuring receptacle, manually operable means accessible to a customer for operating the valves, means between the accessible manually operable means and the valve including a pull rod and lever, full-stroke means having a link member connected to the pull rod, a latch having one member carried by the link, and another member carried by the pull rod, and a fixed throw off in the path of that member of the latch carried by the link.

2. In a dispensing apparatus for liquids, a casing, a reservoir therein, a measuring receptacle for the liquid, means for controlling the flow of liquid into the receptacle, discharge means connected to the receptacle, a valve for controlling the flow of liquid from the receptacle to the discharge means, means for operating the said valve to cause the receptacle to discharge its measured quantity of liquid, a latch pivoted to the valve operating means, fixed ratchet teeth cooperating with the latch to prevent reverse movement of the valve operating means until the valves have been moved to full discharge position, means operable at the end of the movement to lift and maintain the latch out of engagement with the ratchet teeth until the reverse movement is completed, and then release said latch again.

3. In a dispensing apparatus for liquids, a casing, a reservoir therein, a measuring receptacle for the liquid, discharge means connected with the receptacle, valves for controlling the flow of liquid to and from the receptacle, reciprocating means operable to move the valves into position to fill the receptacle or into position to discharge the same, a gravity latch pivoted to said valve operating means, fixed ratchet teeth cooperating with the latch to prevent reverse movement of the valve operating means when actuated to move the valves to discharge position until the valves have completed their movement, a projection in the path of said latch to lift it out of engagement with the ratchet teeth, means for releasing the latch and so maintaining it during the return movement, and means for releasing the locking means at the end of the return movement.

4. The combination with a casing, a reservoir for liquid therein, a measuring receptacle for the liquid, a supply pipe affording communication between the reservoir and the bottom of the receptacle, a vent pipe leading from the top of the receptacle to a point above the liquid level of the reservoir, a rod extending through the vent pipe and carrying a valve for closing the upper end of said pipe, a float in the receptacle connected to said rod, a valve carried by the float for closing the lower end of the vent pipe, a duct leading from the top of the receptacle, a valve carried by the float for closing the duct, a discharge outlet for the receptacle at the bottom thereof, and manually operated valve means at the bottom of the receptacle for alternately opening and closing comunication between the receptacle and the supply pipe and casing and opening communication between the receptacle and the outlet pipe.

5. The combination with a casing, a reservoir for liquid therein, a measuring receptacle for the liquid, a supply pipe affording communication between the reservoir and the bottom of the receptacle, a vent pipe leading from the top of the receptacle to a point above the liquid level of the reservoir, a rod extending through the vent pipe and carrying a valve for closing the upper end of said pipe, a float in the receptacle connected to said rod, a valve carried by the float for closing the lower end of the vent pipe, a discharge outlet for the receptacle at the bottom thereof, and manually operated valve means at the bottom of the receptacle for alternately opening and closing communication between the receptacle and the supply pipe and casing and opening communication between the receptacle and the outlet pipe.

6. In a dispensing apparatus, the combination of a casing, a liquid reservoir therein, a measuring receptacle for the liquid, a supply pipe connection between the reservoir and the receptacle, a vent pipe connecting the reservoir and receptacle, a float within the receptacle, a vent pipe leading from the receptacle to the atmosphere valves carried by the float for closing communication between the receptacle and the vent pipes, an outlet pipe for the receptacle, and valve means for alternately opening and closing communication between the supply pipe and the receptacle and closing and opening communication between the outlet pipe and the receptacle.

7. In a dispensing apparatus for liquids, the combination with a casing, of a holder for individual cups therein, feeding means for delivering the cups one at a time, a chute leading from the holder to the outside of the casing, a cup holder on the outside of the casing at the bottom of the chute, a receptacle for liquids within the casing, a supply means therefor, an outlet for the receptacle leading through the casing, a spout on the outlet to discharge directly into the cup supported by the cup holder, manually controlled valve means for simultaneously closing the supply means and opening the outlet pipe for the receptacle, a manually operated lever on the outside of the casing, and independent connections between the said lever and the feeding means for the cup and the valve means for the receptacle, said connections being timed in operation to release and cause a cup to be placed in position before the liquid is discharged.

8. In a dispensing apparatus for liquids, a casing, a reservoir within the casing, a measuring receptacle for receiving liquid from the reservoir, a valve for controlling the flow of liquid from the reservoir to the receptacle, a discharge pipe leading from the measuring receptacle, a valve for controlling the discharge, means operable to control said valves so as to fill the receptacle and discharge the same respectively, means operable in timed relation to the liquid discharge operating means for engaging the upper peripheral edges of the lowermost one of a column of nested cups to eject the same prior to the opening of the discharge valve, and a chute located in position to receive the cup so ejected and direct it into position for receiving the liquid discharged.

9. In a dispensing apparatus for liquids, a reservoir for the liquid, a receptacle for measuring definite quantities of liquid, manually controllable inlet and outlet valves for the receptacle, said valves being so arranged that one is open while the other is closed and vice versa, a vent pipe leading from the top of the measuring receptacle to a point above the liquid level of the reservoir, a vent pipe leading from the top of the receptacle to the atmosphere, a valve for each of said vent pipes and means operable upon completion of the filling of the receptacle to close said valves.

10. In a dispensing apparatus for liquids, a casing containing a reservoir for holding the liquid to be dispensed, a measuring receptacle within the casing, an elongated horizontal valve casing at the bottom of the measuring receptacle, a pipe connecting one end of the valve casing to the reservoir, another pipe leading from the other end of the valve casing to the exterior of the apparatus, spaced connected valves within said valve casing, said valves being individual to and controlling the respective pipes, manipulating means exterior to the main casing and operable to move said valves simultaneously to close the inlet pipe to the measuring receptacle and to open the outlet pipe, and means connected to the valve operating means and operable in timed relation thereto and prior to the opening of the outlet pipe to eject a cup from a supply thereof and direct it into position beneath the discharge end of said outlet pipe.

11. In a dispensing apparatus for liquids, a main casing, a reservoir therein, a measuring receptacle for the liquid, means between the reservoir and the receptacle for controlling the flow of liquid into the receptacle, a discharge pipe leading from the receptacle, a valve for controlling the flow of liquid through said discharge pipe, a lever having operative connection with the valve for operating the same to cause the receptacle to discharge its measured quantity of liquid when the lever is moved in one direction, a reciprocatory bar connected to said lever and operable to actuate said lever, a latch pivoted to the bar, fixed ratchet teeth cooperating with the latch when the bar is actuated to move the lever to cause the receptacle to discharge its liquid, to prevent reverse movement of the bar until the valve has been fully opened, means operable at the end of the movement to lift and maintain the latch out of engagement with the ratchet teeth until the reverse movement is completed, and then to release said latch again.

12. A dispensing apparatus for liquids, comprising a main casing, a reservoir within the casing for containing liquid to be dispensed, a measuring receptacle within the casing, a valve controlling the discharge of liquid from the reservoir to the measuring receptacle, a valve controlling the discharge of liquid from said receptacle, both valves being mounted on a common stem which is movable longitudinally to close either of said valves while opening the other, an intermediately pivoted lever concealed within the casing and connected at one end to said stem, a bar connected to the other end of the lever and reciprocable to operate said valves, a latch pivoted to the bar, fixed ratchet teeth cooperating with the latch to prevent reverse movement of the bar when the latter is actuated to move said valves to discharge position until the movement has been completed, means operable at the end of the movement to lift and maintain the latch out of engagement with the ratchet teeth until the reverse movement is completed, and then to release said latch again.

13. A dispensing apparatus for liquids, comprising a main casing, a reservoir within the casing for containing liquid to be dispensed, a measuring receptacle within the casing, a valve controlling the discharge of liquid from the reservoir to the measuring receptacle, a valve controlling the discharge of liquid from said receptacle, both valves being mounted on a common stem which is movable longitudinally to simultaneously close either of said valves while opening the other, an intermediately pivoted lever concealed within the casing, a single link connecting one end of the lever to said stem, and means operatively connected to the other end of said lever and accessible to a customer for controlling the inflow and discharge of liquid with respect to the receptacle.

In testimony, that I claim the foregoing as my own, I have hereto affixed my signature.

WILLIAM R. LOVE.